(12) United States Patent
Wewalaarachchi et al.

(10) Patent No.: US 6,571,140 B1
(45) Date of Patent: May 27, 2003

(54) SERVICE-ORIENTED COMMUNITY AGENT

(75) Inventors: Bandu J. Wewalaarachchi, Singapore (SG); M. V. Priyantha Gunasekera, Singapore (SG); Haritharan Gunasingham, Singapore (SG); Rohana Liyanarachchi, Singapore (SG)

(73) Assignee: Eutech Cybernetics Pte Ltd., Singapore (SG)

( * ) Notice: Subject to any disclaimer, the term of this patent is extended or adjusted under 35 U.S.C. 154(b) by 344 days.

(21) Appl. No.: 09/597,857

(22) Filed: Jun. 20, 2000

Related U.S. Application Data

(63) Continuation-in-part of application No. 09/526,981, filed on Mar. 15, 2000, now Pat. No. 6,477,434, which is a continuation of application No. 09/007,438, filed on Jan. 15, 1998, now Pat. No. 6,067,477.

(51) Int. Cl.[7] .............................................. G06F 15/00
(52) U.S. Cl. ............................ 700/83; 700/17; 700/20; 709/203
(58) Field of Search ........................... 700/2, 9, 17, 20, 700/83; 707/103; 709/201, 202, 203, 223, 224, 249

(56) References Cited

U.S. PATENT DOCUMENTS

| | | | | | |
|---|---|---|---|---|---|
| 4,570,217 A | * | 2/1986 | Allen et al. | ..................... | 700/83 |
| 4,635,183 A | * | 1/1987 | Isobe et al. | ..................... | 700/83 |
| 4,644,478 A | * | 2/1987 | Stephens et al. | ............... | 700/83 |
| 4,991,076 A | * | 2/1991 | Zifferer et al. | ................. | 700/87 |
| 5,228,123 A | * | 7/1993 | Heckel | ........................ | 345/334 |
| 5,398,336 A | * | 3/1995 | Tantry et al. | ................ | 707/103 |
| 5,568,402 A | * | 10/1996 | Gray et al. | .................. | 709/204 |
| 5,576,946 A | * | 11/1996 | Bender et al. | ......... | 395/500.39 |
| 5,583,793 A | * | 12/1996 | Gray et al. | .................. | 709/223 |
| 5,604,892 A | * | 2/1997 | Nuttall et al. | .................. | 700/17 |
| 5,825,361 A | * | 10/1998 | Rubin et al. | ................. | 345/349 |
| 6,449,588 B1 | * | 9/2002 | Bowman-Amuah | .......... | 703/21 |

\* cited by examiner

Primary Examiner—Paul P. Gordon
(74) Attorney, Agent, or Firm—Glenn Patent Group; Michael A. Glenn

(57) ABSTRACT

A system and method provide the creation and operation of remote real-time data monitoring and control systems. Such applications include a communications gateway coupled to real-time devices. The communications gateway transforms the real time data collected from disparate and non-interoperable systems in a single common data format. The communications gateway provides an object server with a list of the real-time devices to which the communications gateway is connected, and their attributes. The object server publishes this list. Subscribers can access this list, and request subscriptions to specific attributes of certain devices. The object server creates a data object corresponding to the requested information. A subscriber includes a service agent which accesses the object server. In addition, a subscriber may also comprise presentation cells, which provide a representation and mapping of data objects and hence underlying devices and systems, to allow a user to manage and control such systems. Subscribers including presentation cells may be personalized to function as personal agents. Such personal agents can be programmed to monitor and control certain subsystems, and to alert certain people when specific events occur in these subsystems.

20 Claims, 13 Drawing Sheets

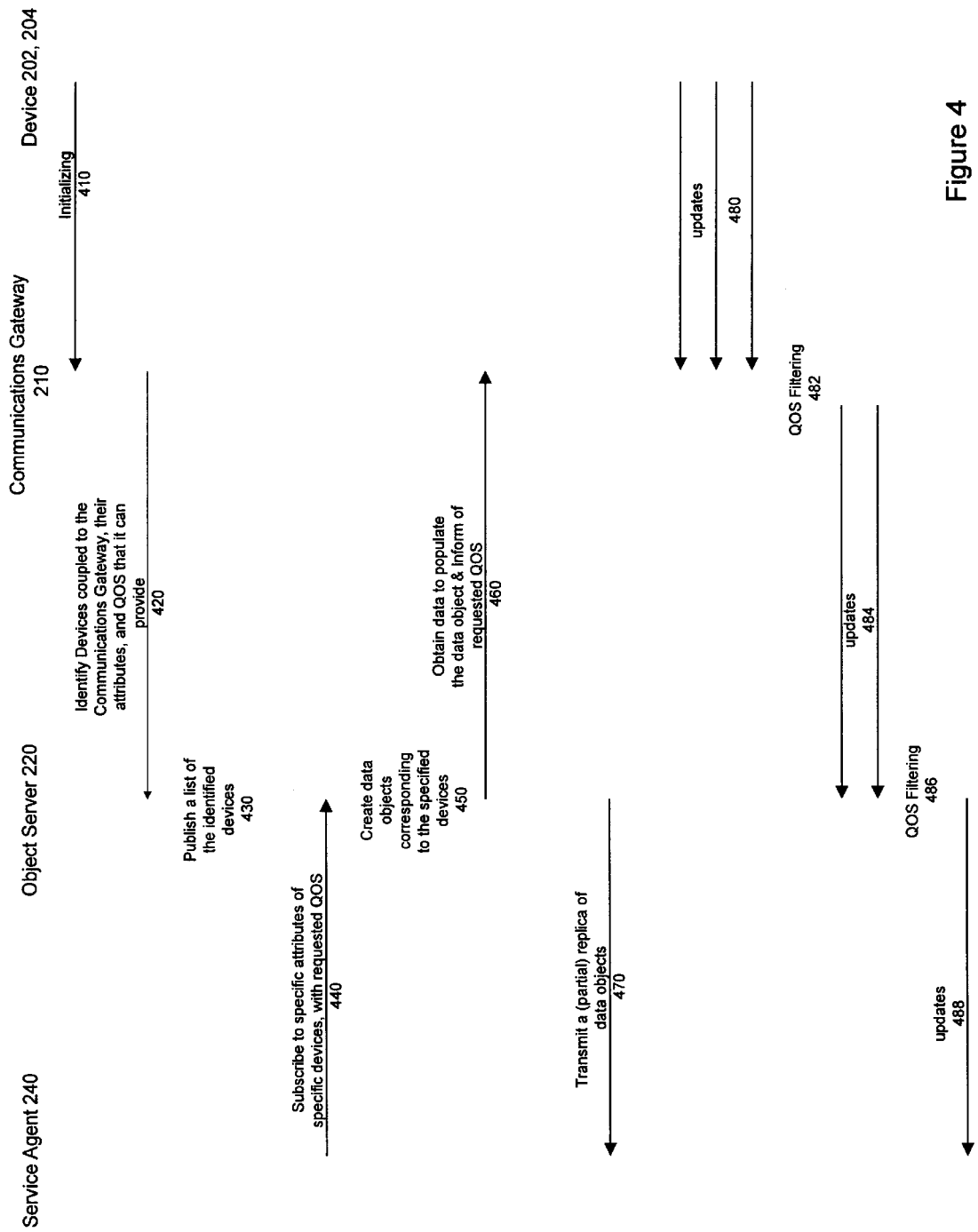

SERVICE-ORIENTED COMMUNITY AGENT

CROSS-REFERENCE TO RELATED APPLICATIONS

This application is a continuation-in-part of U.S. Pat. No. 6,477,434, entitled "Method And Apparatus For The Creation Of Personalized Supervisory And Control Data Acquisition Systems For The Management And Integration Of Real-Time Enterprise-Wide Applications And Systems," by Bandu Wewalaarachchi et al. issued on Nov. 5, 2002, which is a continuation of U.S. application Ser. No. 09/007,438, entitled "Method And Apparatus For The Creation Of Personalized Supervisory And Control Data Acquisition Systems For The Management And Integration Of Real-Time Enterprise-Wide Applications And Systems," by Bandu Wewalaarachchi et al., filed on Jan. 15, 1998, which has issued as U.S. Pat. No. 6,067,477 on May 23, 2000. Both these applications are herein incorporated by reference in their entirety.

BACKGROUND

A. Technical Field

The present invention relates to systems providing for personalized, distributed, portable real time data acquisition and control, and more particularly to a service oriented environment for managing and controlling such systems.

B. Background of the Invention

Real-time systems are necessary where there is a need to guarantee real-time response to achieve a required quality of service of various underlying devices, communications networks, operating systems, middleware components and application components. Thus, real-time systems are widely applied to diverse applications domains such as manufacturing, facilities management, power systems management, financial analysis systems, and telecommunications.

The complexity of real-time systems arises from the need to respond to concurrent events occurring within a single application (or within multiple applications) at the same time. Also, a real-time system must provide some way of managing configuration management, fault management, static and dynamic scheduling, and fault tolerance. However, some applications may be hard real-time applications and others soft real-time applications. This results in increased complexity in managing and correlating data and information generated by the different systems into a single coherent system model.

A common strategy for implementing a real-time system is through a hierarchical architecture, where the system is separated into control, supervisory and management layers. The control layer is generally hard real-time in nature, whereas the supervisory and management layers may have decreasing needs for strict guarantee of time, and in many cases are implemented in software.

Hierarchical real-time architecture systems are increasingly being implemented using the client-server model, in which the centralized database stores real time data and acts as a server to graphical user interface clients. Information is transferred from the control network to the real-time database through an input/output server.

One example of such a hierarchical real-time system is a Supervisory and Control Data Acquisition (SCADA) system. In conventional SCADA systems, the real time data is captured from external sensors, control devices, or applications, and is logged to a centralized database. In response, controls on workstations are executed to manage the remote devices. All actions are performed from a centralized location. Basic control functions include alarm, trend, scan, and status operations.

One problem with conventional SCADA systems is that they are completely centralized. In a client-server system, all of the remote data information is loaded up into the central database, and then remote clients access the system. A problem with this design is degraded performance due to the single point of access, as many remote clients attempt to access the real time data through the single database server. This conventional design thus induces a scalability problem which limits the number of concurrent users.

One solution then is to use multiple real time databases, which partition the data being gathered according to geographic, management, or functional criteria. The problem here is configuration management. Traditionally, configuration is done by mapping input and output points to the database fields. If there are multiple databases, then the system designer has to change the mapping of the remote sensors to the databases, and maintain these mappings over a large number of remote devices and databases. Changes in partitioning of data induce further configuration maintenance. In addition, multiple, partitioned databases make it very difficult to introduce new types of data into the database configuration, and provide for new mappings.

Another solution is an object-oriented framework for the development of personalized workflow applications that provide real time functionality, while maintaining scalability to any number of users, and integration with existing legacy application systems. However, such solutions require that the users model up front, the environment of the real-time devices that need to be monitored and/or controlled.

This can be better understood with the help of an example. Such solutions involved the system administrator/user defining the data objects and their logical relationships at a prior time, where the data objects and their relationships preferably corresponded to the logical or physical organization of devices and in the system being modeled. An example of such a system is shown in FIG. 1A, where there is shown a set of data objects in an object server. A top level parent data object is defined to represent a building, here Building Center, which two floors, represented by the data objects of $1^{st}$ Floor, and $2^{nd}$ Floor. Each of these data objects has further data objects representing different rooms, Room 1 and Room 2. Each Room data object then has both leaf data objects such as Temperature and Ventilation System, and a parent data object Light Control which itself has leaf data objects for two different Light Banks. This organization of data objects preferably represents the actual building being modeled. When the data objects are created, the building is therefore virtually "reconstructed."

Further, addressing of data objects in the object server is preferably provided by hierarchical naming. Each data object is addressed by its path in the object server. For example, the temperature of Room 1 of $1^{st}$ Floor is accessed by "Building Center.$1^{st}$Floor.Room 1.Temperature." Addressing of data objects may also be done with variables. For example, a presentation cell 150, 160, 170 or 180 in FIG. 1B may access any of the leaf data objects of Room 1 by addressing "Building Center.$1^{st}$Floor.Room 1.x", where x is a variable used to select which leaf data object to obtain. Likewise, any address component can be replaced by a variable. When an address of a data object is resolved, the object server obtains the value of the data object using the index and size parameters stored in the underlying leaf data objects.

In the above example, the server would need to be taken off-line and reconfigured, and then taken back up again, every time that a new object is introduced, or every time that some attribute of an object is modified/added. Thus such systems are problematic in that such modifications must be made by the system administrator/user with the server off-line. Thus such a system does not provide real-time data at the time that such modifications are being made.

FIG. 1B depicts such a system by which objects corresponding to real time devices, and their attributes corresponding to different real time data available from those real time devices, are represented and/or updated on presentation cells 302 on the client device.

FIG. 1B shows that an object 100, having "n" attributes, is created on the server side of the system. Each data attribute 110, 120, 130, and 140, has its own address. That is, as described above, only the naming structure in such a system is hierarchical. In actuality, data attributes 110, 120, 130, and 140 have a flat structure. That is, there is no hierarchy employed in the data structure, and each attribute has a separate address on the server side. Each data attribute 110, 120, 130, and 140 is entirely self-contained. The object does not have an address of its own in the system.

Via the network, a copy of the object 100A is created on the client device. Further, a copy is also made of the addresses for each data attribute 110A, 120A, 130A, and 140A. The client device includes presentation cells 150, 160, 170 and 180. Each of these presentation cells 150, 160, 170 and 180 subscribes to a data attribute 110A, 120A, 130A and 140A. Based on the addresses of each data attribute 110A, 120A, 130A and 140A, the presentation cells 150, 160, 170 and 180 can access the values of the data attributes that they subscribe to.

In such a system, the user of the client device is required to define the objects and their data attributes up front—the object model cannot be built dynamically. As can be noted from the steps described above, the user must define all the attributes of each object up front, so that each of these attributes can be assigned its own address. Thus, each time a system employing such a method is used for a different object model, the object model needs to be built to correspond to that particular use of the system. For instance, even if such a system is used only for building maintenance purposes, a separate object model will have to be pre-defined for each distinct building. Dynamic object modeling is not possible with the systems described above.

Thus there exists a need for a solution which permits dynamic modeling of the environment by the user.

Further, current real-time device management/control systems permit access to the real time data from one centralized place, and from one particular medium (for instance a particular computer). This creates a problem because a user of the system may not always be at that centralized place, or have access to that particular medium. For instance, if real time updates of the data were contingent on a computer situated in a user's office being powered on, the user would not be able to obtain the updated real time data from her home if her computer at work were turned off. Further, the user would not be able to access the real time data from a different medium, such as a telephone.

Thus there exists a need for making such management/control systems virtual, and accessible from different places through different mediums of the users' choice.

Another problem with currently existing real time device management/control solutions is that they do not manage Quality of Service (QOS) requirements. By definition, a real-time system provides a result in response to an event in a time scale that is adequate to meet the quality of service and performance needs of the application. Different publishers of data often offer different QOS capabilities. Thus subscribers to the data may wish to choose different publishers based on the QOS offered by them. In addition, different subscribers may be satisfied with different levels of QOS. Subscribers who did not have high QOS requirements may be able to obtain the data at a lower cost than those who require the same data at a higher QOS.

Thus there exists a need to manage QOS requirements of subscribers with the QOS capabilities of publishers of data. Further, there is a need to guarantee end-to-end quality of service to every application, regardless of its implementation, communications protocols, or other integration factors.

SUMMARY OF THE INVENTION

The present invention overcomes the limitations of currently existing real-time data acquisition and control systems by providing a framework which facilitates dynamic building of the object model by allowing dynamic publication of data. In addition, the present system permits a user to access the real time data through various mediums of the user's choice. Further, the present system manages the QOS capabilities of publishers of real-time data as well as the QOS requirements of subscribers to the real time data.

The present invention uses complex data structures, instead of the above-described flat data structures used by some current systems, in order to create a dynamic object server. "Object" structures containing attributes are now created. Instead of allocating an address to each attribute, each object is allocated one address, and there are pointers to the various attributes within one object structure. This facilitates dynamic object modeling.

A system in accordance with the present invention comprises of real time devices, a communications gateway, an object server, and a subscriber to the data. The communications gateway is communicatively coupled to selected ones of the real time devices to receive real time data from the devices. This real time data is received in a format according to a communications protocol associated with the devices; various different devices may have different, non-compatible, proprietary formats. The communications gateway converts the real time data by reformatting it into standardized data format that is independent of the original format used by the devices. The standardized data format specifies for each item of real time data a content and source of the real time data. In this manner, data from many different devices, having different original source formats is converted into a single, standard data format.

The object server is communicatively coupled to the communications gateway and receives from it, a list of the real time devices to which the communications gateway is coupled, as well as their attributes. (These various logical attributes correspond to attributes of individual devices, or collections of devices.) The object server then publishes this list. Once a subscriber requests information about one or more attributes of one or more devices, the object server creates data objects corresponding to the requested devices, along with the attributes of the data objects. The object server then stores the real time data in the data objects that it has created. In this manner, dynamic modeling of the environment becomes possible, because real time devices can define what they have to offer.

For example, in a building management system, the real time data from the field devices will be for many different types of field devices, such as lights, heating units, thermostats, window controls, ventilation systems, elevator banks, and so forth. As received by the communications gateway, the data from the many different field devices is very low level, and disaggregated in the sense that the communications gateway has no knowledge that relates data from different field devices (e.g. readings from different temperature sensors in the same tank). However, when a subscriber expresses interest in a particular device or attribute, the object server dynamically creates a corresponding data object. At this time, the real world data can be organized in a logical manner, such as an abstraction for each floor of the building, within each floor, a number of rooms, and within each room controls for lights, temperature, window position, and so forth. The organization of the data (e.g. hierarchical organization by floor, room, and type of control) is not present in the original real time data received by the communications gateway, but rather, is provided by the object server. Further, it is to be noted that the organization of the object server does not need to be defined up front by the system administrator/user to represent the real world system being managed. Instead, any real world system can be dynamically modeled on demand.

A system in accordance with the present invention may further comprise of a personal agent. Such a personal agent would comprise of a service agent that could subscribe to some attributes of certain objects from the list published by the object server, as well as presentation cells that would provide a representation of these attributes.

This personal agent may reside on a server different from the object server, and may be accessed by users through several different mechanisms, such as through telephone, through browsers, etc. That is, users can then access the published real time data from any place, and through different mediums.

In another aspect of the present invention, a system in accordance with the present invention manages the QOS capabilities of publishers of real time data, and the QOS requirements of subscribers to real time data. If the QOS requested by a subscriber can be provided by a publisher, the requested QOS is provided to the subscriber. If the QOS requested by subscriber cannot be provided by a publisher, the subscriber may be given the option of receiving the desired data from another publisher who can provide the requested QOS. Further, if the channel connecting the subscriber to the publisher is the limiting factor, an alternate channel capable of supporting the requested QOS may be selected.

Accordingly, the present invention represents a substantial improvement over existing approaches for implementing real-time object-oriented systems.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 4 is an event trace of the operation of one embodiment of a system.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Embodiments of the present invention are now described with reference to figures where like reference numbers indicate identical or functionally similar elements and the left most digit(s) of each reference number corresponds to the Fig. in which the reference number is first used.

SYSTEM ARCHITECTURE

Figure 1A:
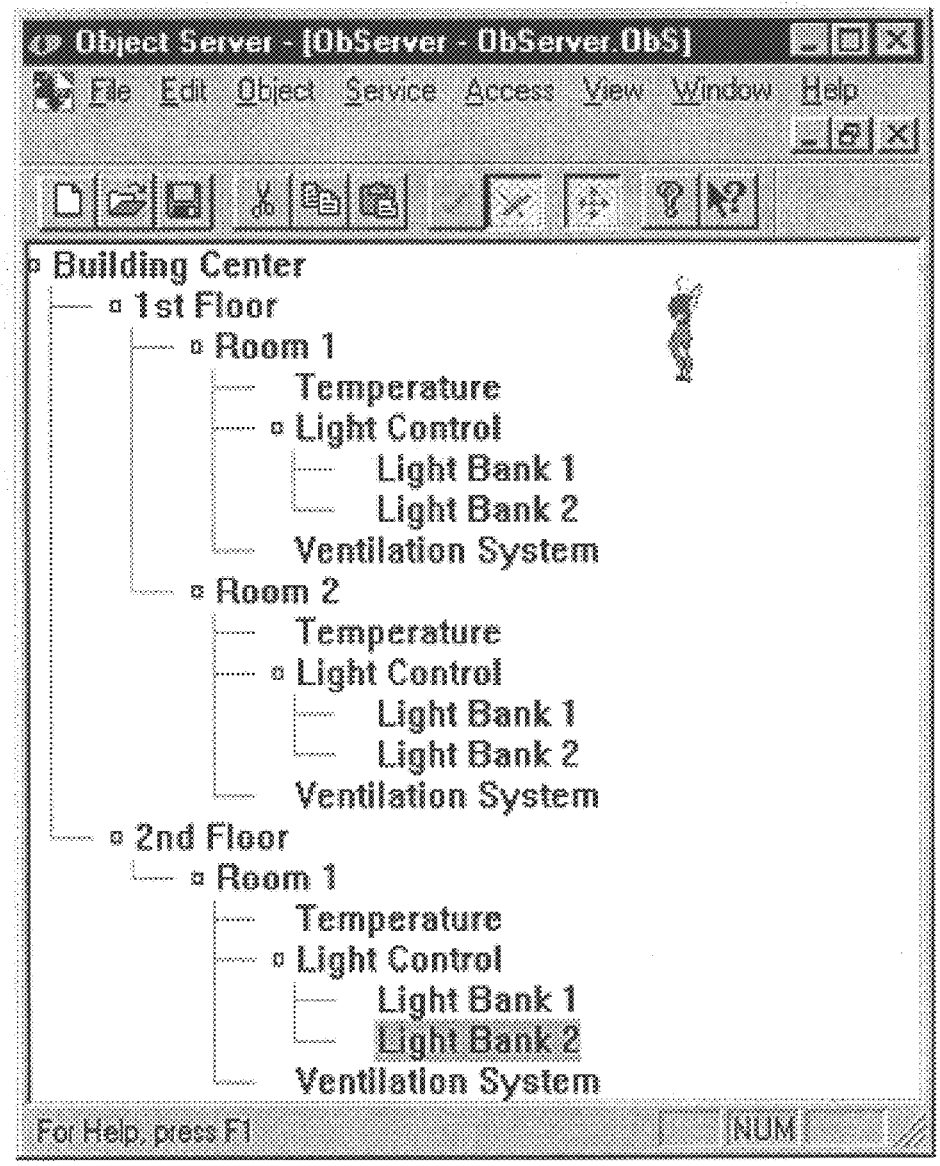
FIG. 1A is an illustration of an example of a collection of data objects in an object server.
Figure 1B:
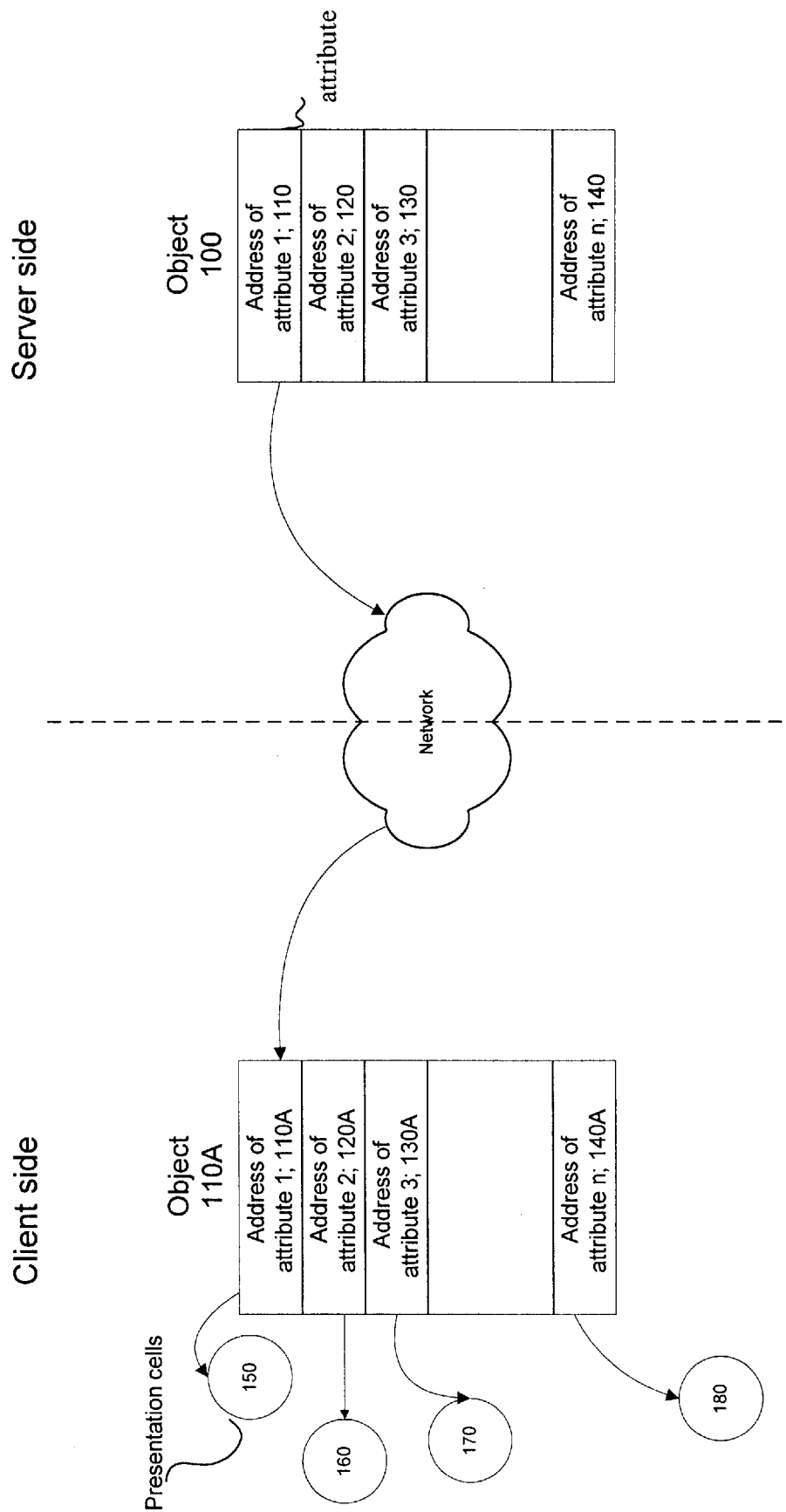
FIG. 1B is an illustration of a currently existing representation of data objects corresponding to real time devices, and their attributes.
Figure 2:
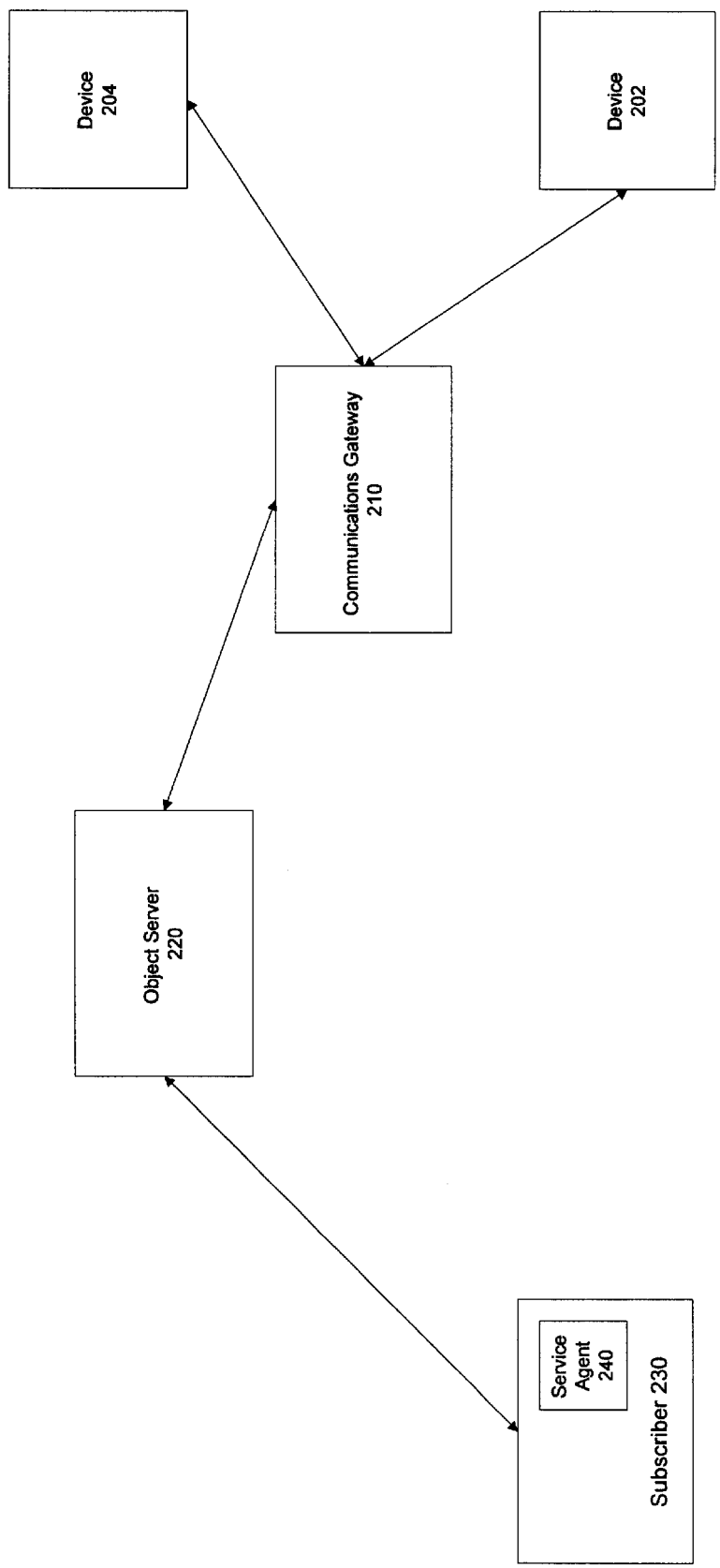
FIG. 2 is an illustration of one embodiment of a system in accordance with the present invention.

Referring now to FIG. 2, there is shown the software architecture of one embodiment of a system in accordance with the present invention. It is comprised of real time devices 202 and 204, a communications gateway 210, an object server 220, and a subscriber 230 including a service agent 240.

Real time Devices

The real time devices 202 and 204 are the components that collect real time data. For instance, for a building maintenance system, these could be temperature sensors, light controls, fan controls, etc. In industrial applications, these devices could include flow meters which measured flow rates and/or pressure differentials. In energy trading systems, these devices could be, for instance, energy meters which measured current power consumption and/or total energy usage. These real time devices collect real time data in various different formats. In particular, each device may collect data in a format according to a communications protocol associated with the device. One of ordinary skill in the art will note that various different devices may have different, non-compatible, proprietary formats.

Communications Gateway

The communications gateway 210 provides an interface between the real time devices 202 and 204, and the object server 220. The communication gateway 210 is responsible for receiving real time data from the real time devices 202 and 204, which will be in various proprietary, device-dependent data formats, and converting it to a standard, device independent data format. Each communication gateway 210 is specific to communicating with particular devices 202 and 204, and is adapted to convert the protocol of such devices to the standard data format. The communication gateway 210 operates with such protocols as BACnet (building automation), LonTalk (control networks) OPC (process control), MAPI (email applications), TAPI (telephony applications), and various programming protocols such as DDE, ODBC, and OLE.

More particularly, the input format to a communication gateway 210 comprises a low level byte stream of data packets containing real time data formatted according to a particular device protocol. In the typical device protocol, the data packets include a device ID, a parameter name, a type (application level and protocol specific), a data length, and the real time data. The real time data is itself typically unstructured.

The communication gateway 210 converts this information into a standardized data format that includes fully structured and typed data, with an indication of the source and the value of the data. The indication of source specifies the particular device 202 or 204 which generated the data. This reformatted data is preferably in the format of <name, value> pairs, where the name indicates the data source, and the value is the structured real time data. In this manner, unstructured, raw real time data from many different sources, having different and often incompatible protocols, is restructured into a consistent representation and format.

Object Server

The object server 220 is communicatively coupled to the communications gateway 210, and receives from the communications gateway 210, a list of the devices 202 and 204 to which the communications gateway 210 is coupled, and their attributes. The object server 220 then publishes this list, which can be used by various subscribers 230, to determine which devices and/or attributes the subscribers 230 are interested in.

Once one or more subscribers 230 have indicated an interest in subscribing to information from any of the devices 202 or 204 to which the object server 220 has access via the communications gateway 210, in one embodiment of the present invention, the object server 220 will then create a data object containing data from the indicated real time device 202 or 204. The section on system operation describes in detail how this is done. The object server 220 enables the subscriber 230, via its service agent 240, to subscribe to this data, and provide real time updates of such data to the presentation cells 302 they service. The published data is in the form of <name, value> pairs, as described above.

Subscriber

The subscriber 230 subscribes to the data published by the object server 220, by means of a service agent 240 included in the subscriber 230. A subscriber 230 may be a personal agent, or it may be a subscriber and re-publisher. If the subscriber 230 is a personal agent, it will include presentation cells 302 for presenting the data to the user. If the subscriber 230 is a subscriber and a re-publisher, another personal agent will have to subscribe to it. Such a scenario is described in further detail with reference to FIG. 6.

In either case, a subscriber 230 must include a service agent 240. A service agent 240 is an entity that interfaces between a presentation cell and the object server 220 to provide the presentation cell with updates of the data objects from the object server 220, and to update the data object with inputs from the presentation cell. One skilled in the art will note that a service agent 240 can service a number of different presentation cells 302 in various different personal agents 300. A service agent 240 provides access to all data objects in a single object server 220. A service agent 240 is associated with a subscriber 230 by a drag and drop operation.

The features of a service agent are more fully described in U.S. Pat. No. 6,067,477.

Each service agent 240 also includes references to each of the presentation cells 302 which it services, and for each of these presentation cells 302, the address of the data object which contains the data of interest to the presentation cell.

Personal Agent

A personal agent 300 comprises a service agent 240 described above, as well as a network of presentation cells 302. The user can interconnect presentation cells and service agents 240 so as to create control and monitoring applications which represent the user's personal workflow.

A personal agent is a user customizable graphical interface through which the user interacts with the system of the present invention. A user may have multiple personal agents configured on their remote computer, each with its own collection of presentation cells and service agents 240.

Figure 3:
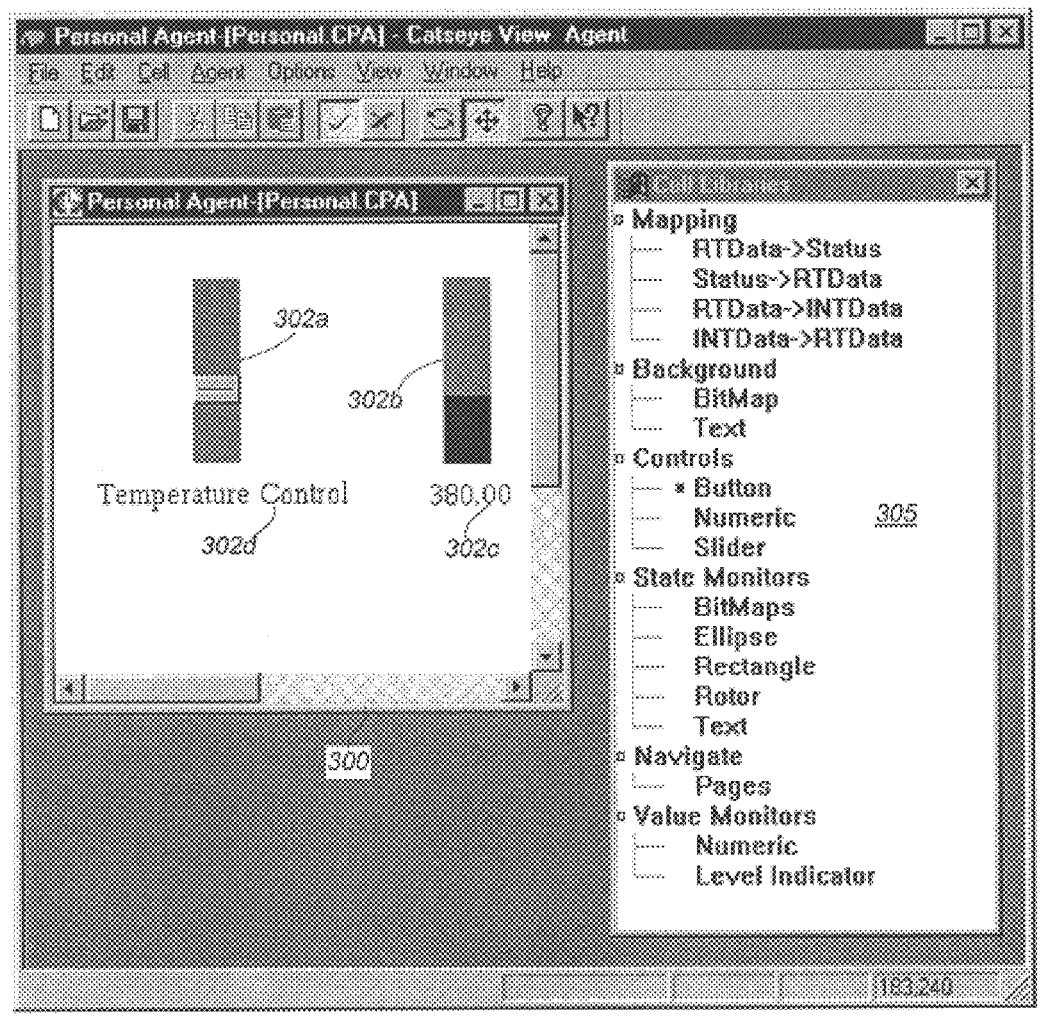
FIG. 3 is an illustration of an example personal agent and a cell library of presentation cells.

Referring to FIG. 3 there is shown an example of a personal agent 300 including several presentation cells 302, including a slider presentation cell 302a, a level indicator presentation cell 302b, a numeric display presentation cell 302c, and text presentation cell 302d. The slider presentation cell 302a is a control cell that allows the user to graphically manipulate the slider, in response to which the presentation cell outputs a value corresponding to the relative position of the slider between the upper and lower boundaries, and a user defined range for these boundaries. Presentation cells such as these are placed into a personal agent 300 by selecting the type of presentation cell from the cell library 305 and dragging and dropping it in the personal agent 300. A presentation cell 302 can take inputs from either a service agent 240, or another presentation cell 302.

In this example, the slider presentation cell 302a controls a temperature, as indicated by text presentation cell 302d which is merely a text label. The slider presentation cell 302a would typically be coupled to a temperature data object in an object server 220, such that direct manipulation of the slider sends a request to communications gateway via object server to update the stored data in the data object. Numeric presentation cell 302c and level indicator presentation cell 302b display the current value of some data object. In this example, the slider presentation cell 302a, the numeric presentation cell 302c, and the level indicator presentation cell 302b are all coupled to a same data object, so that changes in the slider position are reflected, in real time, by corresponding changes in the height of the level indicator and the value of the numeric display upon confirmation of the requested change by communications gateway.

Presentation cells 302 include various user configurable properties, such as data inputs and outputs, valid ranges of data inputs and outputs, position, border, and the like. In particular, the selection of the data objects in an object server 220 that are the inputs and outputs of a presentation cell 302 is managed through simple drag and drop operations.

In the preferred embodiment, various types of presentation cells are provided, including standard presentation cells, background presentation cells, and telephony presentation cells.

Standard presentation cells are used to control and monitor devices 202 and 204. Standard presentation cells include four further types of cells:

State monitors: these are presentation cells that monitor the transition of a control point between two (or more) states, and graphically depict discrete changes in state. Exemplary state monitor presentation cells include bitmaps (which select a different bitmap to display depending on the state of the control point), colored shapes (which change color), text labels (which change text strings), and rotors (which rotate and change color dependent on state).

Value monitors: these are presentation cells that monitor and graphically depict continuous changes in the value of an attribute of a control point. Exemplary value monitor presentation cells include numeric displays and level indicators, as shown in FIG. 6, at 302c and 302b respectively.

Controls: these are presentation cells that allow user modification of an attribute of a field device or control application. Control cells include buttons to increment, decrement, or toggle a value (with user defined value changes); to pulse a value while depressed; numeric input dialogs for direct input of a numeric amount; and slider controls for continuously variable inputs (such as slider control 302a).

Navigate cells: these are presentation cells that enable the user to navigate between different personal agent windows.

Background presentation cells display a passive bitmap image or text label, and are not associated with any field device.

Telephony presentation cells represent a mechanism for interpreting commands and monitoring field devices over a telephone system.

Examples of various types of presentation cells are further detailed in U.S. Pat. No. 6,067,477.

SYSTEM OPERATION

FIG. 4 is an event trace depicting the operation of a system in accordance with one embodiment of the present invention. The interactions between the devices 202 and 204, the communications gateway 210, the object server 220, and the service agent 230, are shown.

The devices 202, 204 first initialize 410 with the communications gateway 210. The initialization process 410 includes informing the communications gateway 210 of the existence of these devices 202, 204, and the attributes that they have to offer. The communications gateway 210, in turn, communicates this information to the object server 220 by identifying 420 the devices 202 and 204 coupled to the communications gateway 210, their attributes.

The object server 220 now publishes 430 a list of all the identified devices 202 and 204. In one embodiment, the object server 220 keeps a registration of object types. The registration information includes how to address the objects, as well as a list of attributes for each object type. The list of attributes includes both a name of an attribute, as well as the type of an attribute. Because object types are registered, the system knows which attributes an object has.

Now a subscriber 230 can subscribe 440 to a particular device, or to a specific attribute of a particular device 202, 204.

The object server 220 then dynamically creates 450 the data object corresponding to that particular device 202, 204. In one embodiment, the created object will only have the attributes requested by the subscriber 230. In an alternate embodiment, the created object may have all its possible attributes.

The object server 220 then obtains data from the communications gateway 210 in order to populate the data objects that it has created. The subscriber 230 then subscribes to the populated object model, and, in this manner, obtains the data that it wanted.

Figure 5A:
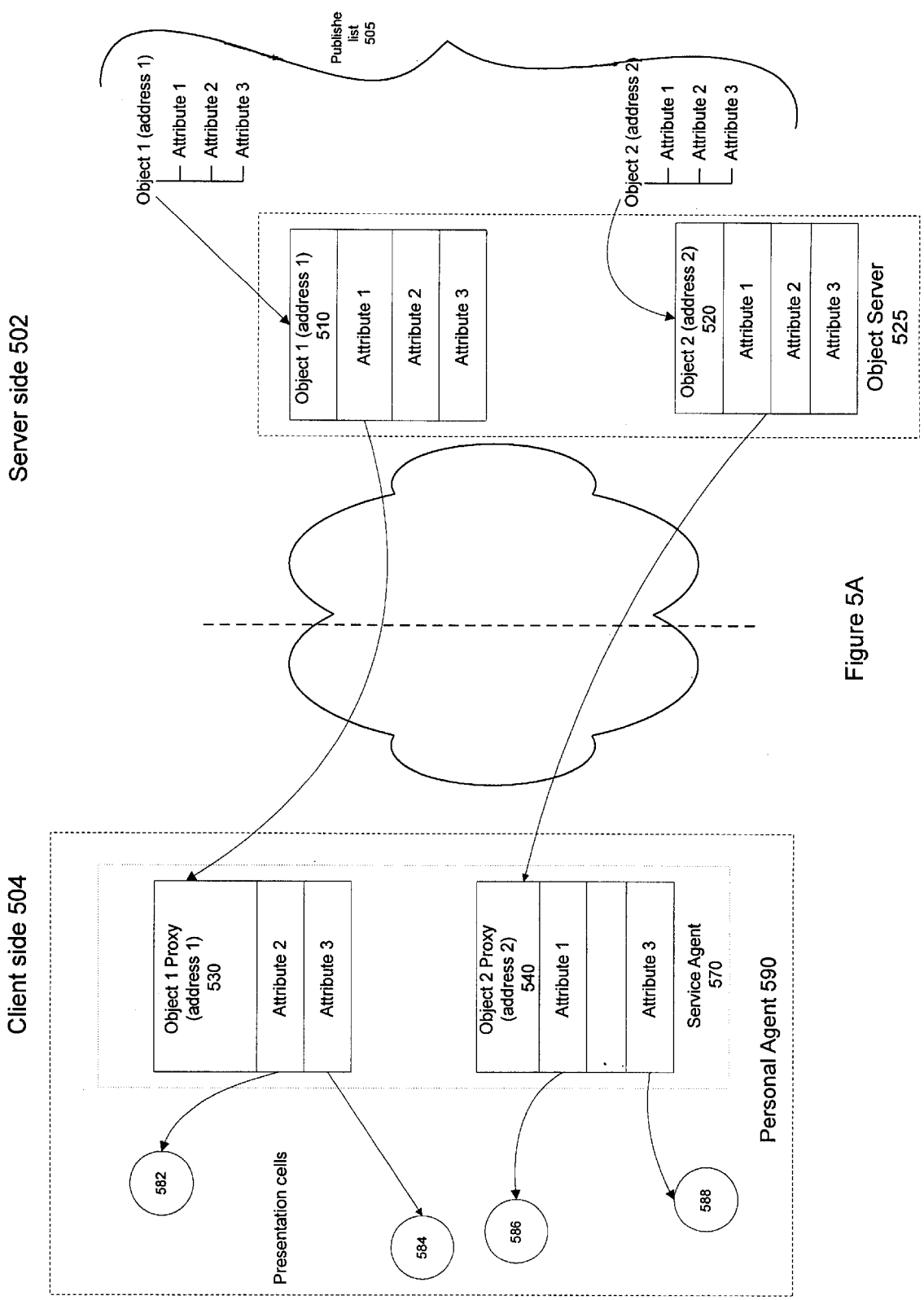
FIG. 5 is an illustration of a representation of data objects corresponding to real time devices, and their attributes.

FIG. 5 depicts a server side 502 and a client side 504, where the server side 502 comprises the object server 220, and the client side 504 comprises a personal agent 590. The personal agent in turn comprises a service agent 570, and a plurality of presentation cells 582, 584, 586, and 588.

It is to be noted that the objects and their attributes are not initially published on the server side. Instead, a mere listing 505 of objects, along with their attributes, is published by the object server 220, which gets this listing from the communications gateway 210. FIG. 5 depicts such a listing 505 of Object 1, with Attributes 1, 2, and 3, and Object 2, with Attributes 1, 2, and 3, and Object 3 with Attributes 1 and 2. When the service agent 570 from the client side subscribes to particular attributes of specific objects, those objects are created on the server side. The objects are complex data structures which are difficult to transmit as they are across the network layer. Thus, in one embodiment, the complex data structures is serialized into data packets and transmitted across the network layer, and the objects (i.e. complex data structures) are reassembled on the client device.

In this case, Object 1 510, and Object 2 520, are created on the server side. A proxy 530 of Object 1 and a proxy 540 of Object 2 are generated on the service agent 570, each object proxy reflects its original address. In one embodiment, the objects 510, 520 created on the server side could have all the attributes of the objects. In another embodiment, the objects 510, 520 created on the server side could have only the attributes subscribed to by the service agent 570. Similarly, in one embodiment, the object proxies 530, 540 could have all the attributes of the objects. In another embodiment, the object proxies 530, 540 could have only the attributes subscribed to by the service agent 570.

Once the object proxies 530, 540 are created, each of the presentation cells 482, 484, 486 and 488 subscribe to a specific attribute. This subscription at the attribute level is possible, in one embodiment, because each attribute can be individually identified. Attribute names of a specific object type are known. Servers are known. Thus once the "object ID" (also known as "object address") is known, the attribute can be identified. In one embodiment, the addressing path for an attribute may be Server$_{13}$ Name(IP Address).Object$_{13}$ ID.Attribute__Name.

Referring to FIG. 4 again, it is to be noted that since the system supports real time devices, continual updates of the data are preferably provided to the subscriber 230. The devices 202, 204 will provide 480 the communications gateway 210 with these updates, and the communications gateway 210 will, in turn, provide 484 the object server with updates. However, the communications gateway 210 will only provide the updates at the QOS requested by the subscriber 230. This is described below in the section on QOS.

Controlling the devices 202 and 204 follows an inverse process. In this case, a presentation cell invokes its service agent 240 to update a data object in the object server 220, passing in the updated value and address of the data object. The service agent 240 communicates with the object server 220, passing it the updated value. The object server 220 then communicates this update to the communications gateway 210, which controls the devices 202 and 204 and confirms the update of value back to object server. The computation of the updated value is determined by the presentation cell, which may, for example, map the position of a slider on the screen display to an updated value for a controlled field device.

Figure 5B:
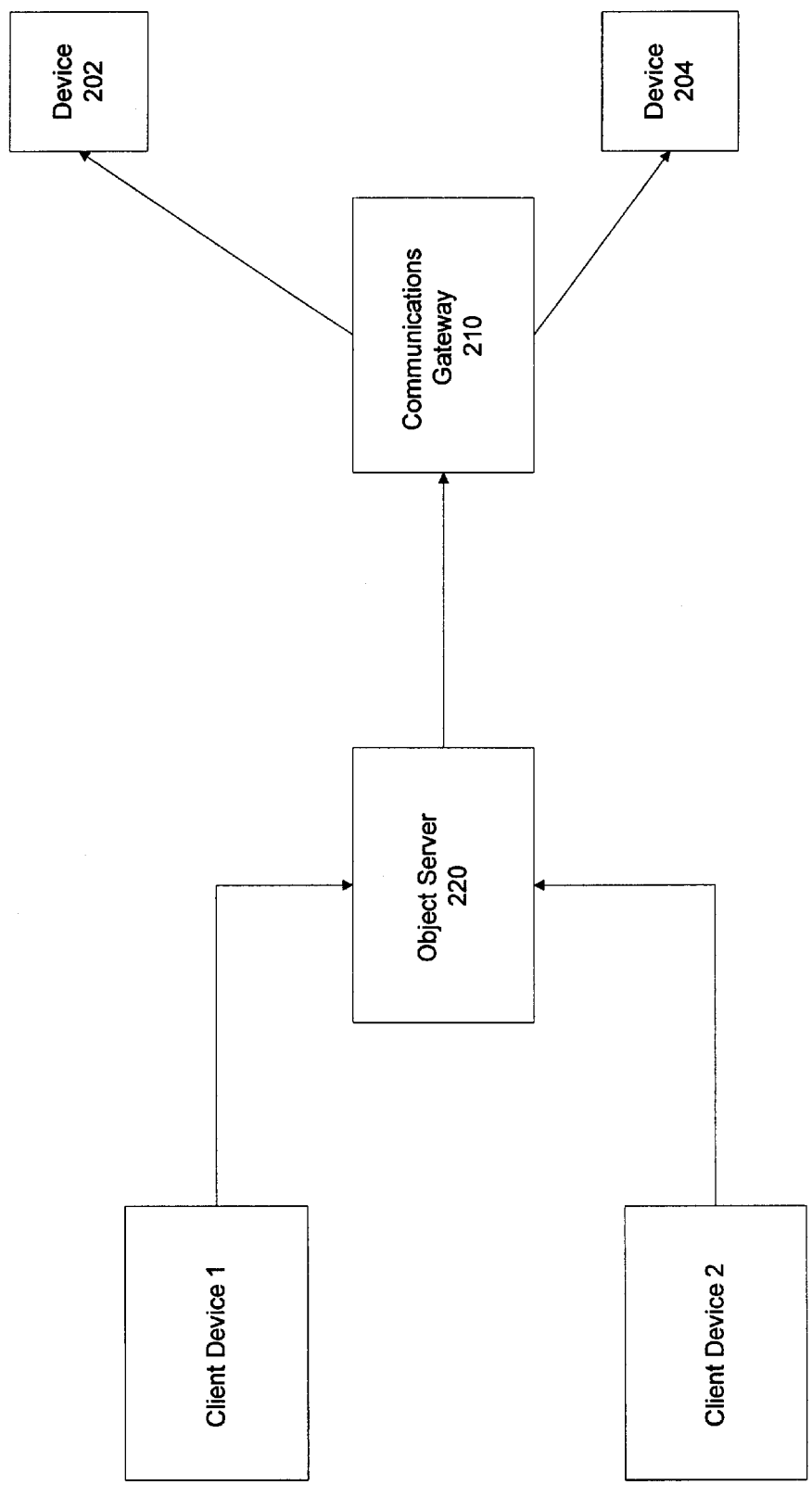

The communications gateway 210 acts as a single point which makes the decision to follow the instructions from a client device. FIG. 5B represents a situation where multiple client devices are connected to a single object server 220. In particular, two client devices, client device 1 and client device 2, are communicating with an object server 220, which in turn communicates with a communications gateway 210. Devices 202, 204 may, in such a scenario, be controlled by either client device 1 or client device 2, or both. If client device 1 and client device 2 both attempt to control, say attribute 1 of device 202, then the communications gateway 210 will decide how to prioritize these requests. Thus, because there is a single point (the communications gateway 210) which makes decisions regarding which instructions to follow, there is no confusion even when multiple clients attempt to control an attribute of a device 202, 204 at the same time.

QUALITY OF SERVICE

In another aspect of the present invention, the Quality Of Service (QOS) capabilities of publishers can be matched with the QOS requirements of subscribers.

Figure 6A:
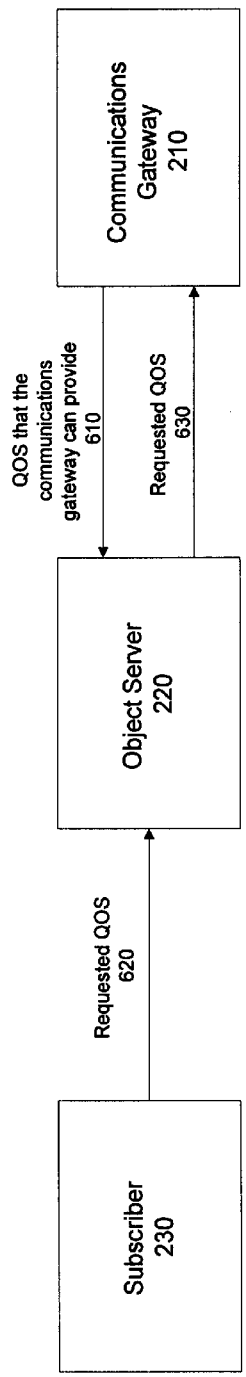
FIG. 6A is an illustration of quality of service management including one subscriber.

FIG. 6A illustrates that in a system in accordance with one embodiment of the present invention, the communications gateway 210 also identifies 610 to the object server 220, the Quality of Service (QOS) that the communications gateway 210 can offer. The QOS may include a frequency at which the value of the real time data is revised, and a tolerance of the real time data, or any other useful metric that describes the QOS capabilities of the communications gateway. The QOS offered by the communications gateway will depend, at least in part, upon how fast it can get updated information from the devices 202 and 204.

When the subscriber 230 subscribes 440 to a particular object, the subscriber informs the object server 220 of the QOS requested 620 by the subscriber 230. The object server 220 will now ascertain whether the communications gateway 210 can provide the QOS requested 620 by the subscriber 230. If not, the object server 220 informs the subscriber 230 that the QOS that it desires cannot be provided by the communications gateway 210. The subscriber 230 can then choose to connect to another object server and/or communications gateway. Alternatively, the subscriber 230 can choose to accept the QOS that the communications gateway 220 can provide, even though is lower than the QOS originally requested by the subscriber 230.

If the object server 220 determines that the communications gateway 210 can provide the QOS requested 620 by the subscriber 220, the object server 220 will inform 630 the communications gateway 210 of the QOS requested by the subscriber 230. The object server 220 will then dynamically create the data objects subscribed to by the subscriber 230, and the subscriber 230 will subscribe to these.

As discussed above, since the present invention supports real time systems, it is preferable that continual updates of the date be provided to the subscriber 230. However, the communications gateway 210 will only provide the updates at the Quality Of Service requested by the subscriber 230. Therefore, even if the devices 202 and 204 provide 480 to the communications gateway 210 at a higher speed, the communications gateway 210 will filter 482 these based on the QOS requirements of the subscriber 230, and only provide 482 the object server 220 with updates at a rate sufficient to satisfy the QOS requested by the subscriber 230. The object server 220, in turn, provides the service agent 240 with the updates 488.

Figure 6B:
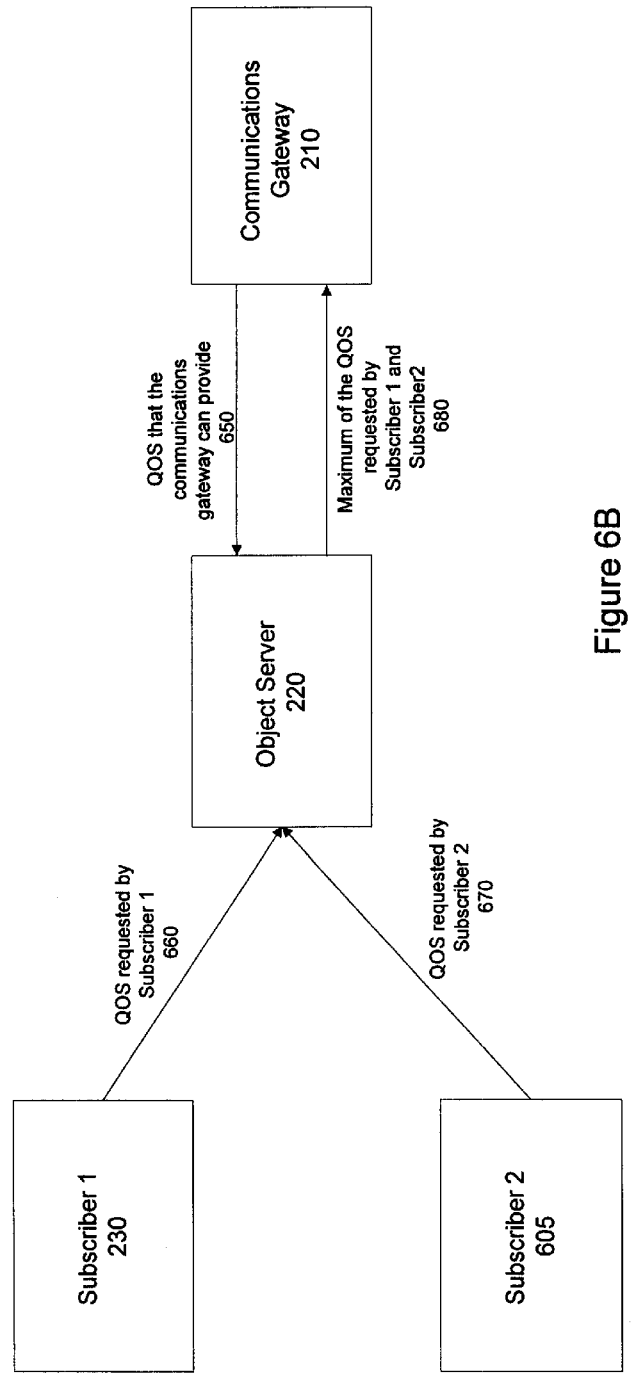
FIG. 6B is an illustration of quality of service management including two subscribers.

In the case that there is more than one subscriber 230, there may be more points at which QOS filtering is performed—once at the communications gateway 210, and again at the object server 220. For example, FIG. 6B represents the embodiment where two subscribers (subscriber 1 and subscriber 2) are subscribing to object server 220. As before, the communications gateway 210 will inform 650 the object server 220 of the QOS it can offer. Subscriber 1 and subscriber 2 will each communicate to the object server 220 the QOS that they require.

With multiple subscribers 230, 605 the object server 220 must determine whether the communications gateway 210 can provide the QOS requirements of each of the subscribers. If not, in one embodiment, the object server 220 informs subscriber 1 and/or subscriber 2, that the QOS that it desires cannot be provided by the communications gateway 210. Subscriber 1 and/or 2, can then choose to connect to another object server and/or communications gateway. Alternatively, subscriber 1 and/or 2, can choose to accept the QOS that the communications gateway 220 can provide, even though is lower than the QOS originally requested by the subscriber 230.

In the latter case, or in the case that communications gateway 210 can provide the QOS requested by both subscriber 1 and 2, in one embodiment, the communications gateway 210 will provide the greater of the QOS requirements of subscriber 1 and subscriber 2. The object server will then, in one embodiment provide subscriber 1 with the QOS that it requested, and provide subscriber 2 with the QOS that it requested.

Referring back to FIG. 4, it can be seen that this is an example of an instance in which there would be a second QOS filtering 486 (in addition to the QOS filtering 482 at the communications gateway 210) at the object server 220, before it provides the service agent 240 with updates 488. In another embodiment, both subscribers 1 and 2, may receive the highest QOS requested by any of the subscribers.

MULTIPLE SUBSCRIBERS AND RE-PUBLISHERS

Figure 7:
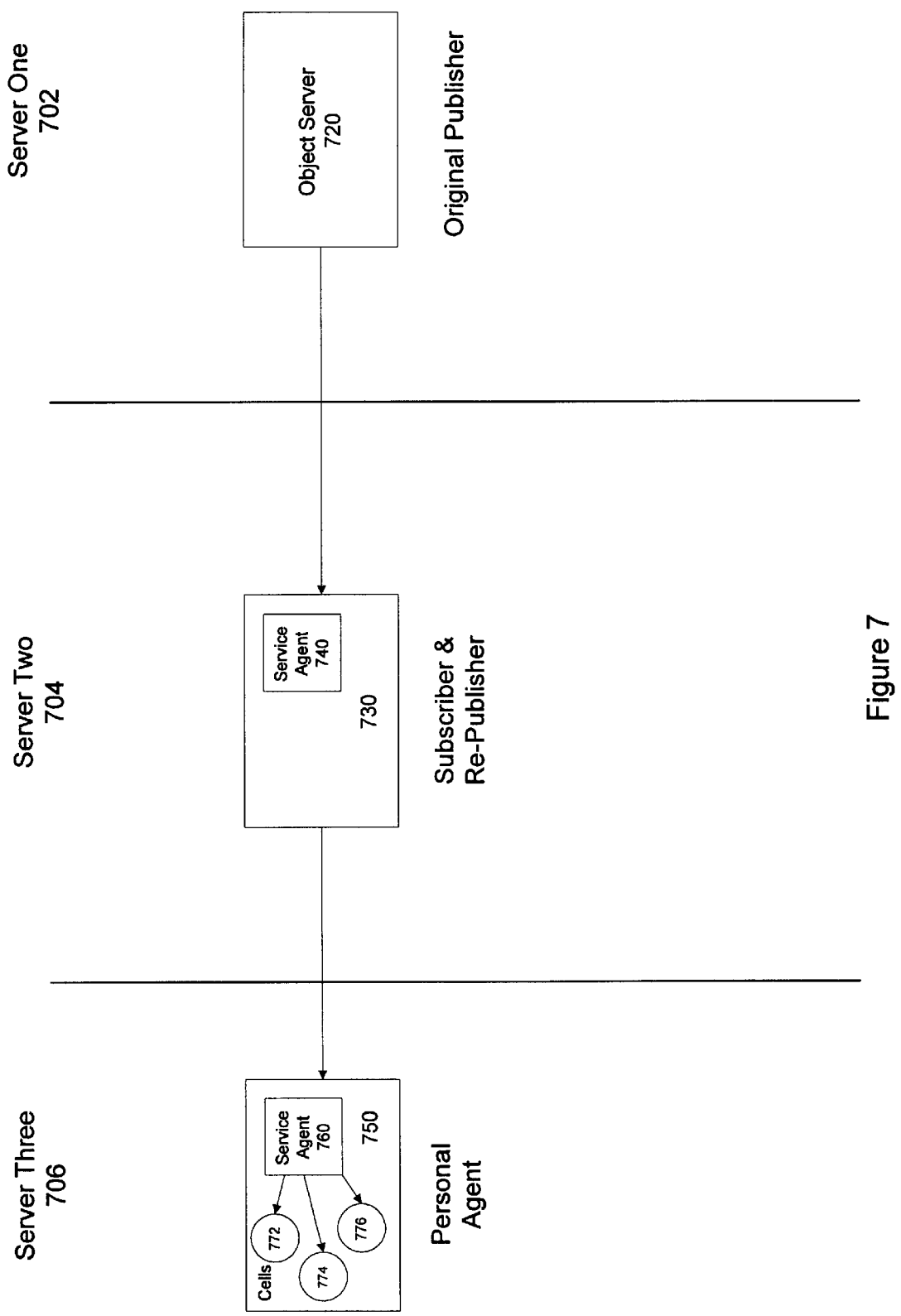
FIG. 7 is an illustration of a system where the subscriber subscribes to real time data and republishes it.

Referring to FIG. 7, it can be seen that, in one embodiment, a "chaining" feature involving subscribing to data and republishing it, can be performed. The system shown in FIG. 7 comprises an object server 720, a subscriber 730, and a personal agent 750. Both the subscribers comprise of service agents 740 and 760. However, only the personal agent 750 includes presentation cells 772, 774, and 776. Three servers 702, 704, and 706 are involved in this system. For example, the object server 720 resides on server one 702, the subscriber 730 resides on server two 704, and the personal agent 750 resides on server three 706. One of ordinary skill in the art will note that it is possible for the object server 720, the subscriber 730, and the personal agent 750, to be on less than three servers. Two or more of these could be on the same server.

In the scenario depicted in FIG. 7, the object server 720 serves as the original publisher of the data. The service agent 740 on subscriber 730 then subscribes to the data. Subscriber 730 then may or may not reformat the data, before it republishes it. Service agent 760 on personal agent 750 now treats subscriber 730 as the publisher of data, and subscribes to the data published by subscriber 730. Finally, a user can get access to the data subscribed to by personal agent 750, by means of the presentation cells 772, 774, and 776.

One skilled in the art will note that such "chaining" need not be limited to that described above, but can in fact be performed with subscribing and re-publishing multiple times.

CELL TEMPLATES

In one embodiment of the present invention, it is possible to create "cell templates," and publish them. A published cell template can be subscribed to and used when desired. Use of such pre-created cell templates saves time because each subscriber does not need to recreate it every time. Further, such pre-created cell templates also have the added benefit that experts in a field can set up appropriate cell templates, and subscribers with less experience can then benefit from their expertise. Creators of cell templates may, in one embodiment, permit subscribers to access the cell templates for free. In another embodiment, a fee may be charged for subscribing to cell templates. In yet another embodiment, certain cell templates may be available for free, while others are available for a fee.

Figure 8A:
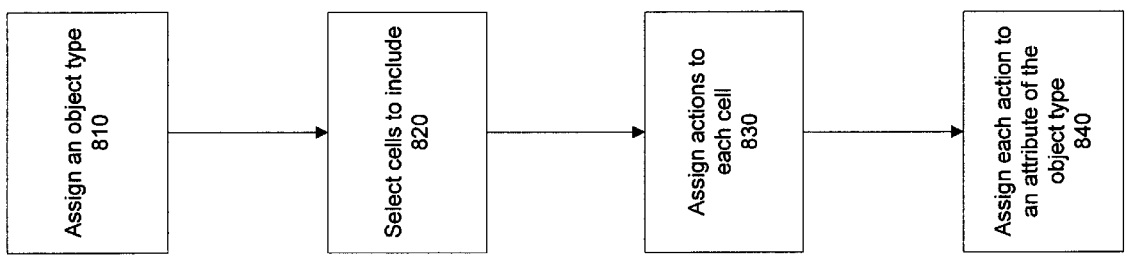
FIG. 8A is an illustration of how cell templates are created.

Creation of Cell Templates:

FIG. 8A demonstrates how cell templates are created. An object type to which the cell template is to be linked is first assigned 810 to it. Next, the cells to be included in the cell template must be selected 820. One or more actions must then be assigned 830 to each of these cells. Each action must then be assigned 840 to an attribute of the object type.

Figure 8B:
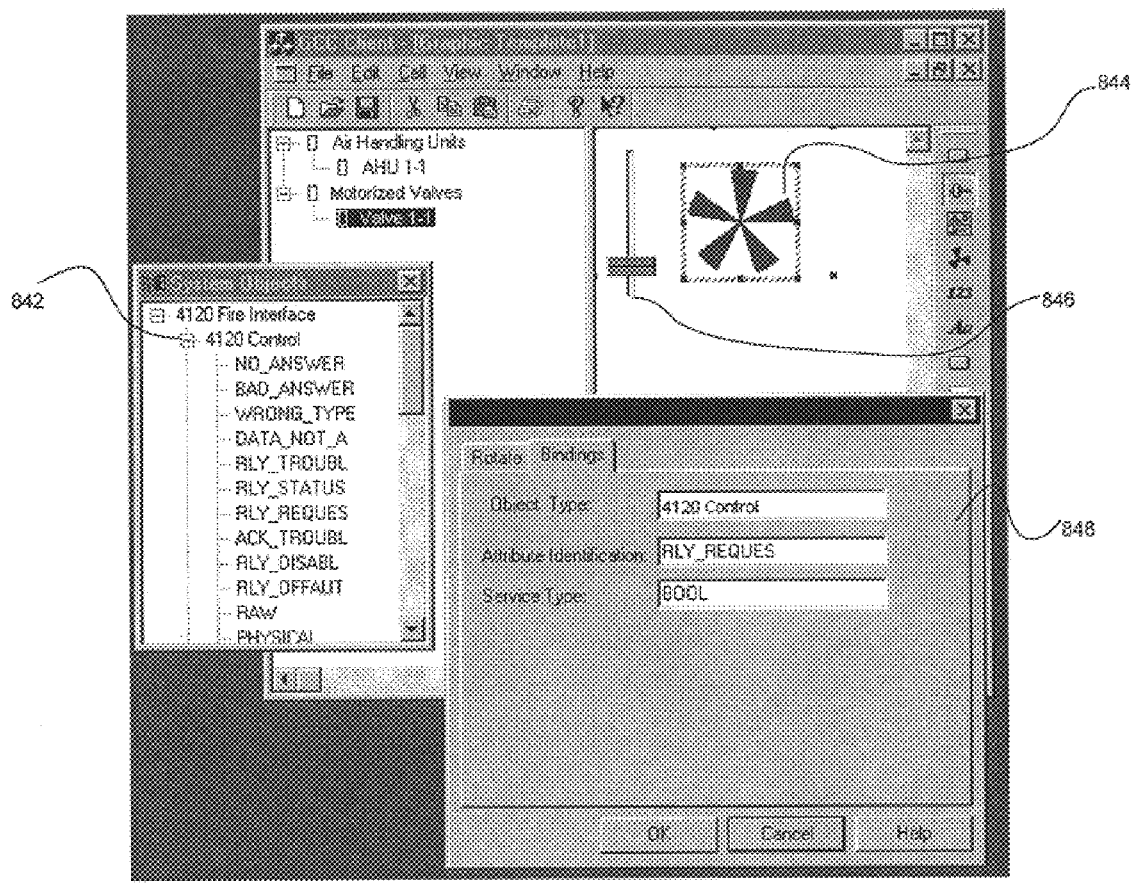
FIG. 8B is a screenshot of a sample cell template.

FIG. 8B illustrates an example of a cell template. The object type 842 to which the cell template is linked could be a room in a building. For the cell template shown in FIG. 8B, a rotor 844 and a slider 846 have been selected 820 for inclusion in it. The rotor 844 and the slider 846 are assigned 830 some actions, corresponding to some attributes, as depicted by 848. For instance, the rotor could be assigned the action of rotating when a fan in a room is turned on. The rotor could be assigned an action of blinking when the temperature in the room goes above a certain threshold. Similarly, the slider can be assigned the action of sliding in order to control a light level in a room. In addition, it can also be assigned the action of blinking when the level of light in the room goes below a certain threshold.

Once created, such cell templates can be published, so that subscribers can have access to them.

Use of Cell Templates:

Published cell templates can be subscribed to. Once a cell template is obtained, it can be used by mapping the desired objects on to it.

Figure 8C:
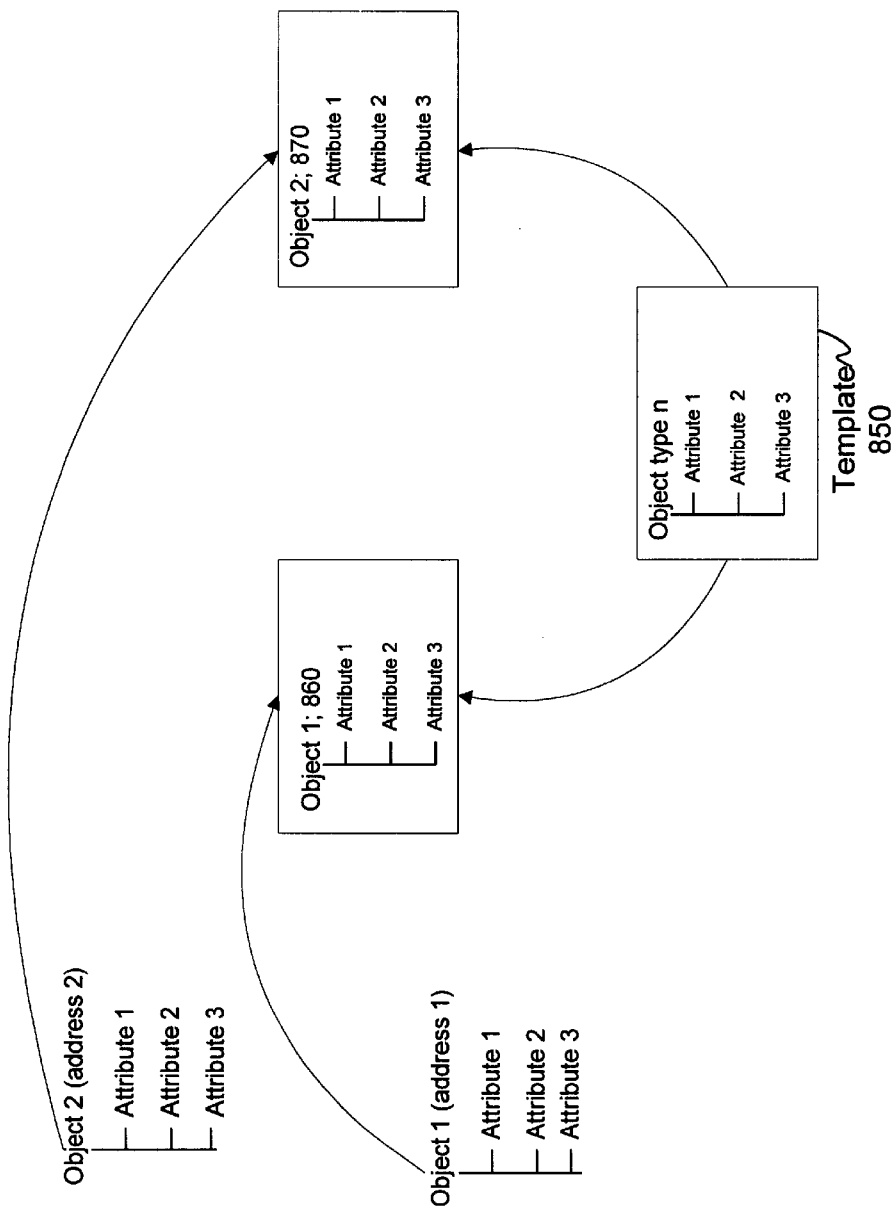
FIG. 8C is an illustration of how cell templates are used.

FIG. 8C represents how cell templates are used. FIG. 8C shows a cell template 850, and two objects 860, 870. In order to map the objects on to the cell template, the objects 860, 870 must be of the same type as the cell template 850.

Each object 860, 870 is then mapped on to the cell template 850. Each attribute of every object 860, 870 then automatically gets mapped on to the attributes defined in the cell template 850. In addition, as shown in FIG. 8C, the addresses of the objects 860, 870 to be mapped on to the cell template 850 must also be provided. The objects 860, 870 to be mapped, along with their addresses, can be obtained from the list of publishable objects published by the object server 220.

Thus the cell template in FIG. 8B above can be mapped to a specific room in a particular building. The fan cell will then automatically be linked to a fan in the room, and the slider cell will then automatically be linked to the light level monitors/controls in the room.

SPECIFIC APPLICATIONS

The present invention can be embodied in several varied applications. The following are a few examples of some such applications.

Facility Management

One embodiment can be used for facility management. In a facility management system, the real time data that needs to be monitored and/or controlled could be for many different types of field devices, such as lights, heating units, thermostats, window controls, ventilation systems, elevator banks, and so forth.

An example would serve to illustrate how such a system could be used for facility management. Assume that the system is monitoring and controlling the management of a building. In response to specific events occurring in the building, specified personnel will be automatically notified. For instance, if an alarm takes place in the Heating/Ventilation/Air Conditioning (HVAC) system, the Building Engineer may be notified. Further, if the event remains unattended for a predetermined period of time, an alternate action may be taken by the system. For instance, if no action is taken on the alarm in the HVAC system for a predetermined period of time, the system may dispatch a work-order to a contracting company via the Internet.

In addition, the system also monitors the equipment, so that the contractor, in response to the work-order, could access real time data to detect the failure/determine the fault accurately. Thus the contractor could use the system to diagnose (and possibly fix) the problem.

In general terms, where the system is used for maintenance management, the field engineers may be the ones to connect the real time devices in the field to the communications gateway. The maintenance engineers can then monitor these devices from a remote location, by observing their output as published by the object server. Alternately, the maintenance engineers can set up personal agents to monitor certain systems of devices on their behalf. The personal agents can also be set up to create alerts and/or notify the maintenance engineers or other appropriate people when certain events occur.

Another example of use of a system in accordance with the present invention follows. Assume a company builds industrial chemical dispensing machines, which are used in swimming pools and in large washing plants. These machines can be connected to the engineers who maintain them, via a such a system.

Here, the engineers could program the personal agents to monitor devices that are assigned to them, and to send a pager message to then when an alarm in such a device goes off. Upon receiving such an alert, an engineer could monitor the real time data from that device using the system, so as to diagnose, and perhaps fix, the problem.

In addition, experienced engineers may create cell templates containing predictive maintenance logic for various devices. If published, these templates could also be used by less experienced engineers. Such use could either be for a fee, or for no cost.

Energy Trading

Another embodiment can be used for managing energy trading. Several possible scenarios can illustrate how the present invention can be applied to energy trading.

One scenario includes remotely monitoring total energy use for a building or facility, as well as current consumption of energy for the building or facility. This can be done by connecting the energy meters in the facility to a communications gateway, which in turn is connected to the object server which publishes this data. This published data can then be remotely accessed.

In an alternate scenario, the published data may not need to be physically monitored by anybody. Instead, one or more personal agents can simply be personalized to set up monitoring of certain attributes, and to control specific attributes. For instance, a personal agent may monitor total energy use in a facility. Further, if the total energy use exceeds a certain threshold level, the personal agent may switch off, for instance, the air conditioning system in the facility. Another example of personalizing a personal agent is starting a generator automatically when the power goes off.

In yet another scenario, multiple buildings may purchase energy on an aggregate basis. An example may help to illustrate this. For instance, assume that a building-owner owns 10 buildings in a town. The building owner may then purchase energy for all the 10 buildings together. The pricing and/or availability of energy may then be based on the aggregate energy requirements of the 10 buildings. In such a situation, only the aggregate energy requirements need be monitored. Thus even if the energy consumption by one building exceeds a certain threshold, if the aggregate sum of the energy requirements of the other buildings does not exceed the total threshold for the 10 buildings, the energy requirements of all the building may be satisfied. The personal agent may thus monitor only the aggregate energy requirements and usage in this case.

Another possible scenario may be best understood by further elaborating on the above example. Assume that the above building owner has signed separate contracts with two energy suppliers, supplier A and supplier B to provide energy to the buildings. The contracts require the building-owner to buy energy at least 30 minutes in advance of when it is required. Also assume that supplier B is more expensive than supplier A. One embodiment may be used to accurately predict usage for the next 30 minutes. This system monitors real-time trends of energy usage from all subsystems utilizing energy in each building, where appropriate objects have been defined and presentation cells have been set up. Such subsystems could include Heat/Ventilation/Air-Conditioning (HVAC) and lighting, database applications (e.g. reservation systems), etc. The system could then aggregate the power requirements of all the 10 buildings owned by the building-owner. By default, the system would serve to buy power from supplier A, and resort to supplier B only when the requirement for energy exceeds the energy supply available from supplier A.

Further, a personal agent for such a system may also be programmed to keep a watch on the Internet for new offers from other energy suppliers, and could automatically place a request for a quotation with energy usage data when such offers are available, or alternately, on a periodic basis (e.g. once an hour). In addition, the system could also notify the building-owner when such an offer is available, and confirm a deal and send an authorization when appropriate. In one embodiment of the present invention, this could be done by the building-owner programming his personal agent to perform these tasks.

Figure 9:
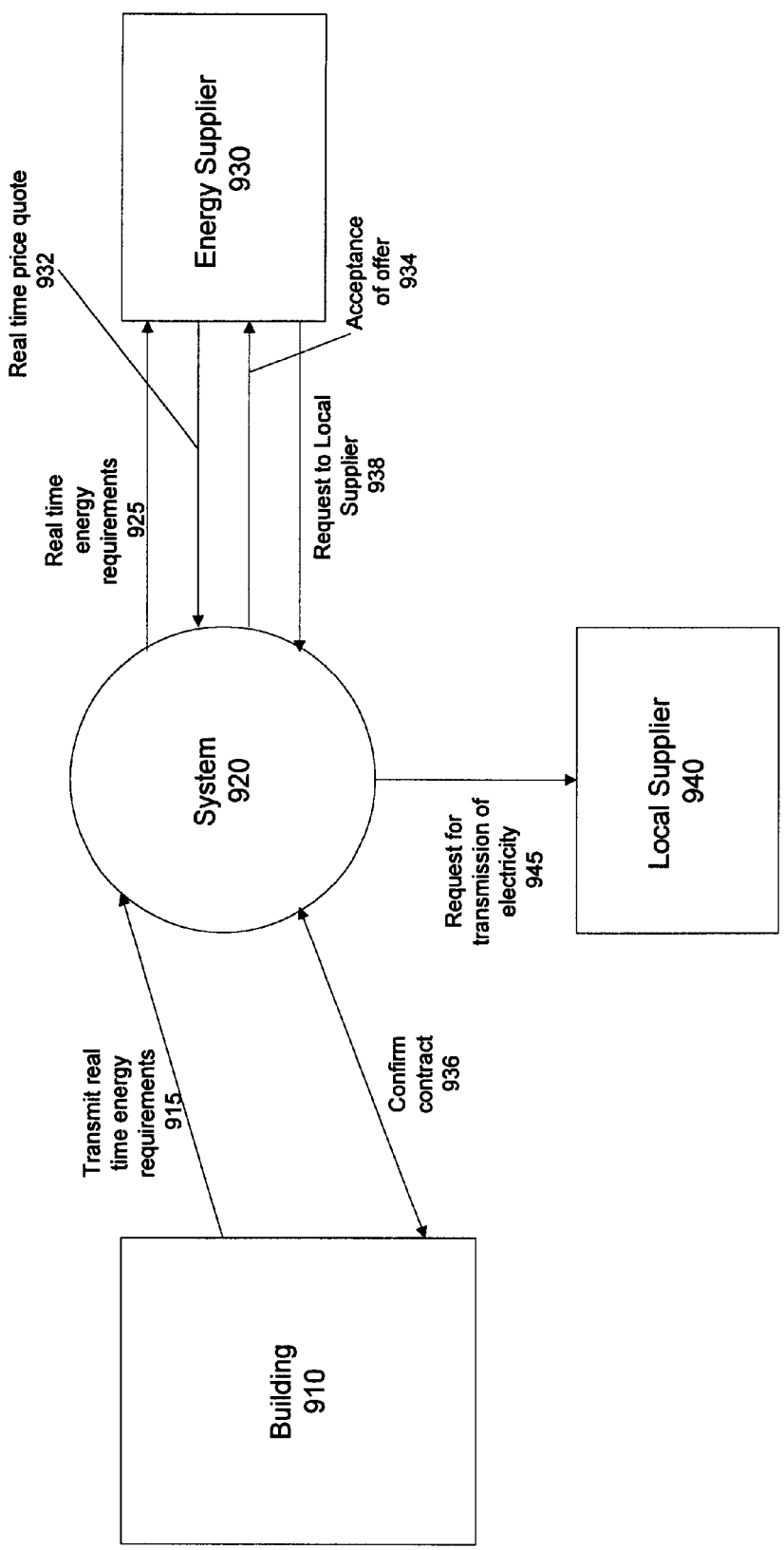
FIG. 9 is an illustration of a system used in an energy trading application.

One example of an "energy-exchange" functionality of one embodiment of a system in accordance with the present invention is depicted in FIG. 9. FIG. 9 depicts a building 910, a system 920 in accordance with the present invention, an energy supplier 930, and a local supplier 940 of energy. The local supplier 940 provides energy in a local area for contracts committed to by the energy supplier 930.

The building 910 first transmits 915 its real time energy requirements. This could include information regarding the occupancy of the building, its instantaneous energy usage, weather information, etc. The system 920 then transmits 925 this information to the energy supplier 930. The energy supplier 930 in turn provides 932 a real time price quote for the energy requirements of the building 910. Based on this price quote, the system 920 accepts 934 (or rejects) the deal offered by the energy supplier 930. The system 920 and building 910 then communicate with each other to confirm 936 the contract. Once the contract is confirmed, the energy supplier 9330 transmits 938 a request for a local supplier 940 located in the same local area as building 910, to provide the building with the requested real time energy. The system 920 communicates 945 this request to the local supplier 940.

Bandwidth Trading

Another system in accordance with the present invention can also be used to manage and control bandwidth trading. Similar to the energy trading application above, a personal agent can be set up to monitor bandwidth usage and requirements. Further, these can also be predicted by observing bandwidth usage per person, and occupancy of a facility. Again, this can be best understood by means of an example.

Assume a building-owner has signed two contracts for bandwidth purchasing with two different networks, Network A and Network B. Further, assume that the network connection is used by the building for two purposes: for providing Internet access to the tenants of the building, and for connecting the Building Management System to remote maintenance contractors.

Moreover, assume say that Network A provides a low cost package of unlimited access with a fixed bandwidth, while Network B offers a connection with a higher quality of service, which is more expensive. Thus Network A is sufficient for regular use in normal conditions, but Network B may be needed in urgent situations, when a high quality of service is required. For instance, a high quality of service may be needed when a work-order is dispatched by the system to a maintenance contractor, and the contractor needs to monitor-real time system parameters to diagnose the problem. When a request for a higher quality of service is detected, the system may automatically switch to Network B.

Other Applications

The above are only a few examples of applications for which a system in accordance with the present invention can be used. Other instances where such a system can be used include creating a health portal, and for process control monitoring (e.g. in chemical plants). One skilled in the art will note that there are several other applications for which a system in accordance with the present invention can be used.

As will be understood by those familiar with the art, the invention may be embodied in other specific forms without departing from the spirit or essential characteristics thereof. Likewise, the particular capitalization or naming of the modules, protocols, features, attributes, data structures, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

We claim:

1. A computer implemented method for managing real-time data from distributed devices that control or monitor physical or logical entities, the devices having attributes representative of states of the entities, the method comprising:

identifying the devices communicatively coupled to a communications gateway;

publishing a list of the identified devices and their attributes;

responsive to receiving, from a subscriber, a request for at least one attribute of at least one device:
creating at least one data object corresponding to the requested device in an object server communicatively coupled to the communications gateway; and
establishing a link from the subscriber to the at least one data object; and transmitting the real time data for the at least one requested attribute of the at least one data object to a service agent on the subscriber, wherein the service agent is communicatively coupled to the object server.

2. The method of claim 1, further comprising:
receiving a command directed towards the at least one requested attribute of the at least one data object;
transmitting, via the service agent, the received command to the object server; and
transmitting the received command to the device corresponding to the at least one data object via the communications gateway.

3. The method of claim 1, further comprising:
receiving a defined cell template comprising at least one cell, wherein the defined cell template comprises a mapping of at least one attribute of a data object type onto the at least one cell in the cell template;
publishing the defined cell template on a remote host computer; p1 linking an instance of the defined cell template to at least one specific data object of the data object type; and subscribing the at least one cell in the cell template to a corresponding at least one attribute of the linked data object.

4. The method of claim 1, wherein the subscriber is a personal agent comprising at least one service agent and at least one cell, the method further comprising:
creating a personal agent on a client device, wherein the personal agent comprises:
at least one service agent;
at least one cell subscribing to an attribute of a data object via the service agent;
computing, by the at least one cell, a desired output from the real time data corresponding to the at least one requested attribute of the at least one data object; and
placing the personal agent on to a remote host computer.

5. The method of claim 4, further comprising:
providing access to the desired output of the personal agent via an interface chosen by the user.

6. The method of claim 4, further comprising:
publishing, as at least one data object with at least one attribute, the desired output of the personal agent, where the published data object may be subscribed to by a second subscriber.

7. The method of claim 4, further comprising:
allowing access to the personal agent, by permitting its withdrawal from the remote host computer;
allowing modification of the at least one cell of the personal agent; and
placing the modified at least one cell of the personal agent to a remote host computer.

8. A computer implemented method for managing quality of service requirements of subscribers, with quality of service capabilities of communications gateways, wherein the communications gateways provide real time data for distributed devices that control or monitor physical or logical entities, the devices having attributes representative of states of the entities, the method comprising:
receiving, from at least one communications gateway, a quality of service level that the at least one communications gateway can provide;
receiving, from at least one subscriber, a quality of service requested by the at least one subscriber; and
responsive to the quality of service level being sufficient to meet the quality of service requested by the at least one subscriber:
informing the communications gateway of the quality of service requested by the at least one subscriber; and
providing the subscriber with the quality of service requested by the at least one subscriber.

9. The method of claim 8, further comprising:
responsive to the quality of service level being unable to meet the quality of service requested by the at least one subscriber, notifying the at least one subscriber that the quality of service requested by the at least one subscriber cannot be provided by the at least one communications gateway.

10. The method of claim 8, wherein notifying the at least one subscriber further comprises offering the at least one subscriber an option of switching to a second communications gateway providing a quality of service level that is sufficient to meet the requested QOS.

11. The method of claim 8, wherein providing the at least one subscriber with the quality of service requested by the at least one subscriber comprises:
responsive to a communications medium being unable to support the quality of service requested by the at least one subscriber, switching to an alternate communications medium that is able to support the quality of service requested by the at least one subscriber.

12. A computer implemented method for managing quality of service requested by subscribers, and quality of service levels provided by communications gateways, wherein the communications gateways provide real time data for distributed devices that control or monitor physical or logical entities, the devices having attributes representative of states of the entities, the method comprising:
receiving, from a communications gateway, a quality of service level that the communications gateway can provide;
receiving, from a first subscriber, a quality of service requested by the first subscriber;
receiving, from a second subscriber, a quality of service requested by the second subscriber; and
responsive to the quality of service level being sufficient to meet the quality of service requested by the first subscriber, but being insufficient to meet the quality of service requested by the second subscriber:
informing the communications gateway of the quality of service requested by the first subscriber;
providing the first subscriber with the quality of service requested by the first subscriber; and
notifying the second subscriber that the quality of service requested by the second subscriber cannot be provided by the communications gateway.

13. The method of claim 12, further comprising:
responsive to the quality of service level supported by the communications gateway being sufficient to meet the quality of service requested by each of the first and the second subscribers:

informing the communications gateway of the greater of the quality of service requested by the first subscriber and the second subscriber;
providing the first subscriber with the quality of service requested by the first subscriber; and
providing the second subscriber with the quality of service requested by the second subscriber.

14. The method of claim 12, further comprising:
responsive to the quality of service level being insufficient to meet the quality of service requested by both the first and the second subscribers, notifying each of the first and the second subscribers that the quality of service requested by each subscriber cannot be provided by the communications gateway.

15. A computer implemented system for managing real-time data from distributed devices that control or monitor physical or logical entities, the devices having attributes representative of states of the entities, comprising:
a communications gateway communicatively coupled to selected ones of the devices to receive real time data from the devices, the real time data formatted according to a communications protocol associated with the devices, the communications gateway converting the received real time data to standardized real time data in a standard data format independent of the devices that specifies for each item of real time data a content and source of the real time data;
an object server communicatively coupled to the communications gateway to receive information regarding the standardized real time data, and to publish a list of the devices and their attributes; and
a subscriber communicatively coupled to the object server, to subscribe to at least one particular attribute of a specific device from the list published by the object server, and in response to which the object server creates at least one data object corresponding to the specific device, the at least one data object having attributes corresponding to attributes of the specific device, the subscriber comprising:
at least one service agent communicatively coupled to the object server to receive standardized real time data of the specific data object.

16. The system of claim 15, the subscriber being a personal agent, further comprising:
at least one presentation cell, each presentation cell providing a representation of a device that is dynamically responsive to real time changes in the attributes of the device, each presentation cell communicatively coupled to the at least one service agent to receive from the at least one service agent the standardized real time data, and mapping the standardized real time data to an output representation.

17. A computer implemented method for managing real-time data from distributed devices that control or monitor physical or logical entities, the devices having attributes representative of states of the entities, the method comprising:
on a first host system:
identifying the devices communicatively coupled to a communications gateway;
publishing a list of the identified devices and their attributes;
on a second host system:
from the published list, requesting at least one attribute of at least one device;
on the first host system:
responsive to receiving, from a subscriber, a request for at least one attribute of at least one device:
creating at least one data object corresponding to the requested device in an object server communicatively coupled to the communications gateway; and
establishing a link from the subscriber to the at least one data object; and
transmitting the real time data for the at least one requested attribute of the at least one data object to a service agent on the subscriber, wherein the service agent is communicatively coupled to the object server;
on the second host system:
republishing the transmitted data;
on a client device:
subscribing to the republished data;
representing the subscribed-to data on at least one presentation cell.

18. A computer program product stored in a computer readable medium for controlling a client device to perform a method for managing real-time data from distributed devices that control or monitor physical or logical entities, the devices having attributes representative of states of the entities, the method comprising:
identifying the devices communicatively coupled to a communications gateway;
publishing a list of the identified devices and their attributes;
responsive to receiving, from a subscriber, a request for at least one attribute of at least one device:
creating at least one data object corresponding to the requested device in an object server communicatively coupled to the communications gateway; and
establishing a link from the subscriber to the at least one data object; and
transmitting the real time data for the at least one requested attribute of the at least one data object to a service agent on the subscriber, wherein the service agent is communicatively coupled to the object server.

19. A computer program product stored in a computer readable medium for controlling a client device to perform a method for managing quality of service requirements of subscribers, with quality of service capabilities of communications gateways, wherein the communications gateways provide real time data for distributed devices that control or monitor physical or logical entities, the devices having attributes representative of states of the entities, the method comprising:
receiving, from at least one communications gateway, a quality of service level that the at least one communications gateway can provide;
receiving, from at least one subscriber, a quality of service requested by the at least one subscriber; and
responsive to the quality of service level being sufficient to meet the quality of service requested by the at least one subscriber:
informing the communications gateway of the quality of service requested by the at least one subscriber; and
providing the subscriber with the quality of service requested by the at least one subscriber.

20. A set of computer program products stored on computer readable mediums for controlling a client device to perform a method for managing real-time data from distributed devices that control or monitor physical or logical entities, the devices having attributes representative of states of the entities, the method comprising:

on a first host system:
identifying the devices communicatively coupled to a communications gateway;
publishing a list of the identified devices and their attributes;

on a second host system:
from the published list, requesting at least one attribute of at least one device;

on the first host system:
responsive to receiving, from a subscriber, a request for at least one attribute of at least one device:
creating at least one data object corresponding to the requested device in an object server communicatively coupled to the communications gateway; and
establishing a link from the subscriber to the at least one data object; and
transmitting the real time data for the at least one requested attribute of the at least one data object to a service agent on the subscriber, wherein the service agent is communicatively coupled to the object server;

on the second host system:
republishing the transmitted data;

on a client device:
subscribing to the republished data;
representing the subscribed-to data on at least one presentation cell.

* * * * *